United States Patent
Baillargeon (10) Patent No.: US 9,301,211 B2
(45) Date of Patent: Mar. 29, 2016

(54) REPORTING PERFORMANCE AND CONTROLLING MOBILITY BETWEEN DIFFERENT RADIO ACCESS TECHNOLOGIES

(71) Applicant: Telefonaktiebolaget L M Ericsson (publ), Stockholm (SE)

(72) Inventor: Steve Baillargeon, Gatineau (CA)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 231 days.

(21) Appl. No.: 13/971,180

(22) Filed: Aug. 20, 2013

(65) Prior Publication Data

US 2015/0056995 A1 Feb. 26, 2015

(51) Int. Cl.
*H04W 36/00* (2009.01)
*H04W 36/14* (2009.01)
*H04W 36/22* (2009.01)
*H04W 48/20* (2009.01)
*H04W 28/08* (2009.01)
*H04W 88/06* (2009.01)

(52) U.S. Cl.
CPC .......... *H04W 36/0022* (2013.01); *H04W 36/22* (2013.01); *H04W 48/20* (2013.01); *H04W 28/08* (2013.01); *H04W 36/14* (2013.01); *H04W 88/06* (2013.01)

(58) Field of Classification Search
CPC ..... H04W 48/18; H04W 88/06; H04W 36/22; H04W 36/14; H04W 28/08; H04W 48/16; H04W 84/12; H04W 36/0022; H04W 48/20; H04W 88/10; H04W 36/0066; H04W 48/06; H04W 92/02; H04W 36/30; H04W 28/02; H04W 28/0205; H04W 28/0247; H04W 28/0263; H04W 28/0268; H04W 36/24; H04W 24/02; H04W 36/0016; H04W 36/08
See application file for complete search history.

(56) References Cited

U.S. PATENT DOCUMENTS

| 7,068,607 | B2 | 6/2006 | Partain et al. |
| 2003/0207687 | A1 | 11/2003 | Svedevall et al. |
| 2009/0191862 | A1* | 7/2009 | Amirijoo et al. ............ 455/424 |

(Continued)

FOREIGN PATENT DOCUMENTS

| GB | 2498749 A1 | 7/2013 |
| WO | 2013052312 A1 | 4/2013 |
| WO | 2013118056 A2 | 8/2013 |

OTHER PUBLICATIONS

3GPP TSG RAN WG3 Meeting #69 R3-102269, Aug. 2010.*

(Continued)

*Primary Examiner* — Daniel Lai
(74) *Attorney, Agent, or Firm* — Christopher & Weisberg, P.A.

(57) ABSTRACT

A method and system for reporting performance and controlling mobility between multiple different radio access technologies are disclosed. According to one aspect, a controller in a network collects performance data concerning at least a first network operating according to a first radio access technology, RAT, and a second network operating according to a second RAT, the first RAT being different from the second RAT. The controller includes a performance monitoring collector, PMC, configured to collect performance data from at least a node of the first RAT and from at least a node of the second RAT. The collected performance monitoring data is analyzed to trigger selection of at least one serving radio cell for a user equipment, UE, connection based on the analysis.

26 Claims, 6 Drawing Sheets

(56) References Cited

U.S. PATENT DOCUMENTS

| | | | |
|---|---|---|---|
| 2011/0077030 A1* | 3/2011 | Wigren et al. | 455/456.5 |
| 2011/0269494 A1* | 11/2011 | Kobayashi | 455/509 |
| 2012/0082064 A1* | 4/2012 | Awoniyi et al. | 370/255 |
| 2012/0128000 A1 | 5/2012 | Baillargeon et al. | |
| 2012/0129517 A1 | 5/2012 | Fox et al. | |
| 2012/0324100 A1 | 12/2012 | Tomici et al. | |
| 2013/0029588 A1* | 1/2013 | Bienas et al. | 455/7 |
| 2013/0077482 A1 | 3/2013 | Krishna et al. | |

OTHER PUBLICATIONS

International Search Report and Written Opinion (Form PCT/ISA/210) dated Feb. 25, 2015 for International Application No. PCT/IB2014/063994, International Filing Date: Aug. 20, 2014 consisting of 14-pages.

K. Hedayat et la.—Network Working Group, RFC: 5357, Category: Standards Track, "A Two-Way Active Measurement Protocol (TWAMP)" Oct. 2008 (28-pages).

Calhoun et al., Network Working Group, RFC: 5416, Category: Standards Track, "Control and Provisioning of Wireless Access Points (CAPWAP) Protocol Binding for IEEE 802.11" Mar. 2009 (76-pages).

OMA Device Management Protocol Candidate Version 1.3—Oct. 9, 2012 Open Mobile Alliance OMA-TS-DM_Protocol-V1_3-20121009-C (60-pages).

3GPP TS 48.018 V11.1.0 (Nov. 2012) 3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 11) (187-pages).

3GPP TS 23.402 V11.5.0 (Dec. 2012) 3rd Generation Partnership Project; Technical Specification Group Services and System Aspects; Architecture enhancements for non-3GPP accesses (Release 11) (252-pages).

3GPP TS 36.413 V11.3.0 (Mar. 2013) 3rd Generation Partnership Project; Technical Specification Group Radio Access Network; Evolved Universal Terrestrial Radio Access Network (E-UTRAN); S1 Application Protocol (S1AP) (Release 11) (274-pages).

3GPP TS 24.312 V12.1.0 (Jun. 2013) 3rd Generation Partnership Project; Technical Specification Group Core Network and Terminals; Access Network Discovery and Selection Function (ANDSF) Management Object (MO) (Release 12 (174-pages).

IEEE Std 802.11™—2012, Part 11: Wireless LAN Medium Access Control (MAC) and Physical Layer (PHY) Specifications, IEEE Computer Society, (Revision of IEEE Std 802.11-2007) Mar. 29, 2012 consisting of 2,793-pages.

* cited by examiner

REPORTING PERFORMANCE AND CONTROLLING MOBILITY BETWEEN DIFFERENT RADIO ACCESS TECHNOLOGIES

TECHNICAL FIELD

The present invention relates to wireless communications and, in particular, to methods and systems for reporting performance and controlling mobility in a wireless communication network.

BACKGROUND

Most user equipment (UE) handsets support two different radio access technologies. One such radio access technology is wide local area network (WLAN). Another such radio access technology is cellular radio technology defined by the third generation partnership project (3GPP), and in particular, universal terrestrial radio access network (UTRAN) or evolved-UTRAN (E-UTRAN). Some UEs can route Internet protocol (IP) traffic over a single radio access interface at a time, while other UEs can route IP traffic over two different radio access interfaces at a time. In both cases, a network operator desires to control which radio access technology is selected and which traffic is routed over one radio access technology as opposed to another.

Many operators have adopted a simple offloading strategy. The basic principle of this strategy is that, whenever a WLAN access point is available and visible to a UE, some or all of the traffic is routed to the WLAN, thereby offloading the 3GPP radio access network. This is known as WLAN offload and provides rudimentary traffic load balancing among different access networks.

WLAN offload has many benefits, but also has many challenges. Desirably, a single subscriber should only have to login once to access both networks. Also, there should be seamless mobility between access networks. Another problem to be solved is the optimization of the user experience regardless of the access network and the effective usage of the radio and backhaul resources. WLAN access points can be highly utilized and/or deployed with lower backhaul capacity to enable cost efficient network deployments. In some cases, the end user experiences degrade if the UE routes all or some of its IP traffic over the WLAN.

Each radio access technology has its own protocol, policies and procedures which may be referred to as radio admission control (RAC). Radio admission control is responsible for radio bearer traffic admission control and traffic scheduling. In long term evolution (LTE) networks, the radio resources are managed by distributed radio access nodes such as eNodeBs (eNBs). In wideband code division multiple access (WCDMA) networks, the radio resources are managed by distributed radio access nodes such as nodeBs (NBs) and radio network controllers (RNCs). In WLAN networks, the radio resources are managed by distributed radio access nodes like the access points (APs) and access controllers (ACs). The backhaul resources are managed by another set of protocols, policies and procedures often referred to as Ethernet and IP traffic management. The backhaul resources are managed by nodes such as routers and switches and can be remotely monitored by radio access node sites such as the NodeBs, APs and ACs.

An access network and selection function (ANDSF) specified by 3GPP is used to manage inter-systems mobility policy (ISMP), inter-system routing policy (ISRP) and access network discovery information (ANDI). The ANDSF is located in the operator's IP network and supports the open mobile alliance device management (OMA-DM) protocol. The ANDSF may initiate the provision of information from the ANDSF to the UE in a push mode of operation. The UE may also initiate the provision of all available information from the ANDSF in a pull mode of operation. The ISMP, ISRP and ANDI can also be statically preconfigured by the operator on the UE. The ISMP, ISRP and ANDI may be provided to the UE by the ANDSF via an S14 interface and may take precedence over the policies and information preconfigured on the UE.

The ISMP is a set of operator-defined rules and preferences that affect the inter-system mobility decisions taken by the UE when it can route traffic over a single radio interface. A purpose of the ISMP is to select the preferable access technology that should be used by the UE to access all destinations. The granularity of access system connectivity is per packet data network (PDN) connection basis. This implies that when a handover occurs, all of the IP flows belonging to the same/single PDN connection are moved from the source access system to the target access system.

The ISRP is a set of operator-defined rules and preferences that affect the inter-system routing decisions taken by the UE when it can route traffic simultaneously over multiple radio interfaces. A purpose of the ISRP is to select the preferable access technology that should be used by the UE to access a specific access point name (APN) or a specific IP flow. The granularity of access system connectivity is per IP flow or per APN basis. This implies that when a handover occurs, some IP flows of the PDN connection are routed via one access system while simultaneously, some IP flows of the same PDN connection are routed via another access system. The other possibility is that some PDN connections are routed via one access system while simultaneously some PDN connections are routed via another access system.

The ANDI provides further information for the UE to access the radio access network defined in the ISMP or in the ISRP. Upon UE request, the ANDSF may provide a list of access networks available in the vicinity of the UE.

A problem with the ISMP, ISRP and ANDI policies is that they provide a preferential list of access technologies that a UE should use in a given location and/or at a given time of day and such list of preferences is static or semi-static. In today's network, where certain radio access networks are always busy or when resource consumption highly fluctuates, planning a successful time of day to offload UEs or certain IP flows while achieving optimal subscriber performance delivery and optimal use of the available cell and backhaul transport resources is a very difficult task and may not even be possible.

It is possible to introduce a bandwidth broker server within each radio access network. The broker is responsible for collecting and correlating the load status on the cells across radio access networks and to accept/deny each subscriber connection request when a cell or transport path across the transport network is congested. This method has limitations. It requires additional servers to deploy and manage in each radio access network; potentially one set of servers per radio access technology (WLAN, E-UTRAN, UTRAN and Global System Mobile Edge Radio Access Network (GERAN)). It also requires continuous transfer of cell and path performance information to a centralized server. Fundamental changes to the signaling architecture would be required when a bandwidth broker is introduced. Introduction of the bandwidth broker would require a new bandwidth broker client or radio

SUMMARY

Methods and systems for managing allocation of resources in a radio access network are disclosed. According to one aspect, the invention provides a first controller that includes a first performance monitoring collector (PMC), a performance data analyzer and an inter-RAT admission and mobility function. The first PMC is configured to collect first performance data related to at least one radio cell of the first radio access network operating according to a first radio access technology, RAT. The first PMC is also configured to collect second performance data related to at least one radio cell from a second PMC of a second controller of a second radio access network operating according to a second RAT. The at least one radio cell of the second access network is one of neighboring and partially geographically overlapping the at least one radio cell of the first radio network. The performance data analyzer is configured to analyze the first and second performance data collected by the first PMC. The inter-RAT admission and mobility function is configured to trigger the selection of at least one serving radio cell for a user equipment, UE, connection based on the analysis of the first and second performance data. The at least one serving radio cell includes one or more cells from the at least one radio cell of the first radio network and the at least one radio cell of the second radio network.

According to this aspect, in some embodiments, the inter-RAT admission and mobility function is further configured to assign the UE to the selected at least one serving radio cell. In some embodiments, the selection of the at least one serving radio cell is based on a policy of maintaining communication by the UE using the first RAT unless one of a cell of the first RAT in which the UE operates and a backhaul network is operating under a load that exceeds a threshold. In some embodiments, the data analyzer is further configured to determine an allocation of one of flows and bearers of the UE to at least one of the first RAT and the second RAT based on an analysis of the first and second performance data. In some embodiments, the selection of the at least one serving radio cell is based on a policy that is communicated to the UE using a 3GPP Access Network and Selection Function, ANDSF, located within one of the first controller and a separate node. In some embodiments, the first and second performance data includes performance data of backhaul resources of at least one of the first RAT and the second RAT. In some embodiments, the performance data includes at least one of accessibility, retain ability and utilization characteristics of serving cells and target cells of at least the first RAT and the second RAT. In some embodiments, the performance data includes average throughput performance of each user equipment using one of the first RAT and the second RAT. In some embodiments, the first controller is located in one of a mobile management entity, MME, access controller, and a radio network controller, RNC, of the first RAT. In other embodiments the first controller is located in an access controller, AC, of the first RAT. In some embodiments, the first RAT is 3 GPP technology and the second RAT is Wi-Fi technology. In some embodiments, the first PMC periodically issues a request for retrieving performance data from one of another PMC and a PMC aggregator of at least one node of one of the first RAT and the second RAT. In some embodiments, a method to retrieve performance data is a 3GPP radio access network, RAN, information management, RIM, protocol. In some embodiments, the first PMC samples performance data periodically. The periodicity of sampling may be less than a periodicity of analysis of the performance data by the performance analyzer. In some embodiments transmission of second performance data to the first PMC is triggered by an event detected by the second controller of the second radio access network. In some embodiments, the triggering event is one of improvement and degradation of performance of one of the at least one radio cell of the first radio network and the at least one radio cell of the second radio network.

According to another aspect, the invention provides a method of monitoring resources of a plurality of different radio access technologies, RATs. The method includes, in a controller of a first radio access network: collecting at a first performance monitoring collector, PMC, of the controller, first performance data relating to a first radio cell operating according to a first RAT of the plurality of RATs. The method further includes receiving at the first PMC second performance data from one of a second PMC and a PMC aggregator. The second performance data relates to a second radio cell operating according to a second RAT of the plurality of RATs. The method further includes analyzing the first and second performance data to trigger selection of at least one serving radio cell for a user equipment connection based on the analysis of the first and second performance data. The at least one serving radio cell includes one or more cells from the at least one radio cell of the first radio network and the at least one radio cell of the second radio network.

According to this aspect, in some embodiments the method further includes assigning the UE to the selected at least one serving radio cell. In some embodiments collecting the performance data reports from one of the second PMC in the PMC aggregator includes sending a request from the first PMC to one of the second PMC and PMC aggregator. In some embodiments, the first PMC is located in one of a mobile management entity, MME, an access controller, and a radio network controller, RNC, of the first RAT.

According to another aspect, the invention provides a system for managing resources in a wireless communication system having a plurality of radio access technologies, RATs. The system includes a first controller that includes a first performance monitoring collector, PMC, located at a first node of a first RAT. The first controller is configured to collect first performance data related to a first radio cell operating according to the first RAT. The first controller is further configured to receive and collect second performance data from a second PMC located at a second node of a second RAT. The second performance data relates to a second radio cell operating according to the second RAT, where the second RAT is different from the first RAT. The second PMC is located at the second node of the second RAT and is configured to collect the second performance data from the second radio cell and transmit the second collected performance data to the first PMC. A first analyzer is configured to analyze the first and second performance data to determine a serving radio cell to serve a first user equipment, UE. The system also includes a first inter-RAT admission and mobility function configured to trigger selection of at least one first serving radio cell for the first user equipment connection based on the analysis of the first and second performance data. The at least one first serving radio cell includes one or more cells from the at least one radio cell of the first radio network and the at least one radio cell of the second radio network.

According to this aspect, in some embodiments, the system further includes a second controller that includes the second PMC located at the second node of the second RAT. The second controller is configured to collect the second performance data relating to the second radio cell operating according to the second RAT. The second controller is further configured to receive and collect the first performance data from the first PMC located at the first node of the first RAT, where the first performance data relates to the first radio cell operating according to the first RAT. The second controller includes a second analyzer configured to analyze the first and second performance data to determine a serving radio cell to serve a second user equipment. A second inter-RAT admission and mobility function is configured to trigger selection of at least one second serving radio cell for the second user equipment connection based on the analysis of the first and second performance data by the second analyzer. The at least one second serving radio cell includes one or more cells from the at least one radio cell of the first radio network and the at least one radio cell of the second radio network.

According to this aspect, in some embodiments, the first inter-RAT admission and mobility function is further configured to assign the first UE to the selected at least one first serving radio cell. In some embodiments, the first RAT is 3GPP technology and the first node is one of an evolved node B, eNB, and a mobility management entity, MME. In these embodiments, the second RAT may be Wi-Fi technology and the second node may be one of an access controller and an access point. In some embodiments, the first RAT is Wi-Fi technology and the first node is one of an access controller and an access point. In these embodiments, the second RAT may be 3GPP technology and the second node may be one of an evolved node B, eNB, and a mobile management entity, MME. In some embodiments the first node is a radio network controller, RNC, and the second node is an access controller.

DETAILED DESCRIPTION

Before describing in detail exemplary embodiments that are in accordance with the present invention, it is noted that the embodiments reside primarily in combinations of apparatus components and processing steps related to reporting performance and controlling mobility between multiple different radio access technologies. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments described herein provide for transfer of performance indicators to one or more locations across an interface between different radio access technologies. In this written description, the radio access technologies primarily discussed are 3GPP and WLAN. However, the invention is not limited to these two radio access technologies. The performance indicators may include cell capacity, cell user accessibility and cell user retainability performance. The performance indicators may also include available transport capacity and quality, as well as individual UE performance. Embodiments also provide methods and systems that control UE access, handover and redirection between the radio access technologies based on the collected performance indicators.

Figure 1:
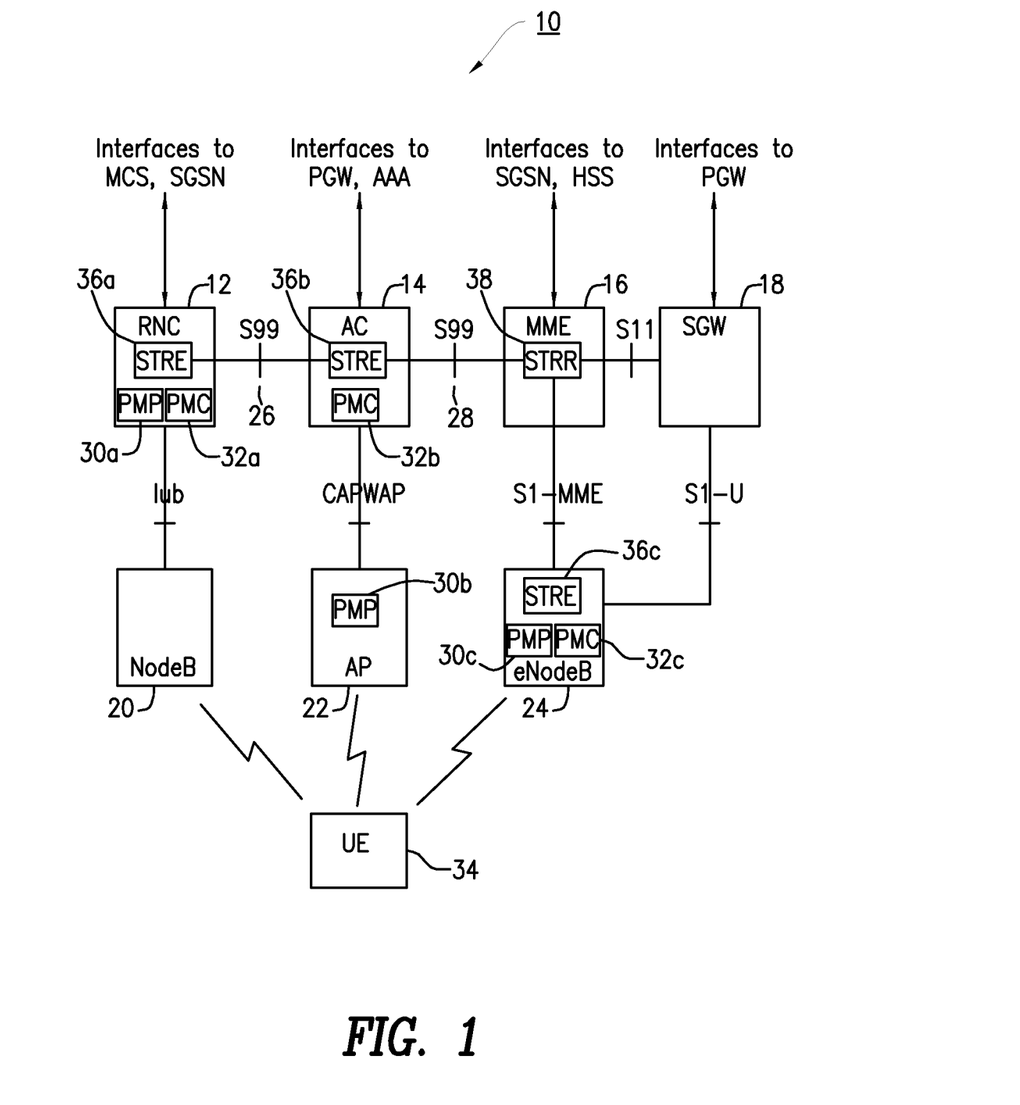
FIG. 1 is a block diagram of a communication network that performs performance monitoring of multiple radio access technologies constructed in accordance with principles of the present invention.

Embodiments described herein provide performance monitoring, performance reporting between radio access technologies and performance-based admission control and mobility policy. Referring now to the drawing figures in which like reference designators denote like elements, there is shown in FIG. 1 a communication network 10 that includes three exemplary different radio access technologies. A first radio access technology is UTRAN having a radio network controller (RNC) 12. A second radio access technology is a Wi-Fi network having an access controller (AC) 14 A third radio access technology is EUTRAN having a mobile management entity (MME) 16. The third radio access technology may also include a serving gateway (SGW) 18. The RNC 12 is linked by a Iub interface to a nodeB 20 belonging to the first radio access technology. The AC 14 is linked by a CAPWAP interface to an access point (AP) 22 belonging to the second radio access technology. The MME 16 is linked by an S1-MME interface to an eNB 24 belonging to the third radio access technology. The SGW 18 is also linked to eNB 24 by an S1-U interface. The RNC 12 is in communication with the AC 14 via a first S99 interface 26. The AC 14 is in communication with the MME 16 via a second S99 interface 28.

A performance monitoring function may be embedded in any one or more of the radio access nodes 12, 14, 16 and 18 and/or the base stations 20 and 24 and/or the access point 22. A performance monitoring function can be one of two entities: a performance monitoring producer (PMP) and a performance monitoring collector (PMC). The PMP monitors and reports the PM data to the PMC. The PMP and the PMC can be located at one or more nodes. For example, in the embodiment of FIG. 1, PMPs 30a, 30b, and 30c are located at the RNC 12, the access point 22 and the eNB 24, respectively. The PMPs are referred to collectively herein as PMPs 30. The PMCs 32 a, 32b and 32 c are located at the RNC 12, the AC 14 and the eNB 24, respectively. The PMCs are referred to collectively herein as PMCs 32. In other embodiments, the PMPs 30 and the PMCs 32 can be located in other nodes.

A PMP 30 functions to independently and transparently monitor and report accessibility, retainability and utilization characteristics of its serving cells, monitoring the end-to-end backhaul transport resources and estimating the average UE performance at various time intervals during the day. The performance metrics or indicators measured by the PMP 30 can be determined using passive monitoring techniques, such as monitoring the number of received packets, lost packets and transmitted packets. Active monitoring protocols may also be employed, such as injecting test packets using the two-way active measurement protocol, TWAMP.

A PMC 32 functions to collect performance data for its serving cells, collecting performance data received from cells on neighbor nodes, and/or collecting performance data from cells from any nodes that are of interest in its geographic area. A radio access node that includes a PMP can also include a PMC. A PMC 32 may be embedded in a radio access node capable to control the UE access to the radio access node's respective network of serving cells. Nodes managing UE policies like the ANDSF can also act as a PMC.

Thus, in the example of FIG. 1, the RNC 12 has both a PMP 30a and a PMC 32a. The PMP 30a of RNC 12 monitors performance metrics of the nodeB 20 and the UEs 34 connected to the nodeB 20. The PMC 32a collects performance data at least from the PMP 30a, and possibly the PMPs of other nodes. Similarly, eNB 24 also includes a PMP 30c and a PMC 32c. The PMP 30c monitors performance metrics of the eNB 24 and the UEs 34 connected to the eNB 24. The PMC 32c collects performance data at least from the PMP 30c. The PMP 30b monitors performance metrics of AP 22 and the UEs 34 connected to the AP 22. Finally, the PMC 32b collects performance data from any or all of the other nodes shown in FIG. 1. It is contemplated that the PMPs and the PMCs can be distributed among the nodes in other ways and is not limited to the arrangement shown in FIG. 1.

The performance data collected by the PMCs for each cell can be included in a cell performance report. A cell performance report may be divided into data for a node, data for a cell, data for a UE, and backhaul performance data. Each cell performance report may be uniquely identified by a cell identifier. For example, the node data in a cell performance report may include measurements of node processor utilization and node availability. The cell data in a cell performance report may include, but is not limited to, cell downlink scheduling activity, cell uplink scheduling activity, available capacity, control channel utilization, number of active UEs, accessibility success rate, and abnormal release rate. The UE data in a cell performance report may include, but is not limited to, average downlink latency, average uplink latency, average downlink throughput, average uplink throughput, average uplink loss rate, and average downlink loss rate. The backhaul data in a cell performance report may include, but is not limited to, transmit one-way packet delay, receive one-way packet delay, transmit packet loss ratio, received packet loss ratio, receive available bandwidth capacity, and transmit available bandwidth capacity. A PMC may also store neighboring or overlapping cell performance reports. Such performance reports may be used locally by a radio access node for subscriber access control. Note that cell performance reports are not exchanged with the UE. This information may be considered sensitive and therefore may be protected from unauthorized use.

As shown in FIG. 1, embodiments include a point-to-point logical interface between a pair of nodes of different radio access technologies. This logical interface, such as S99 26 and the S99 28, is used to exchange cell performance reports between radio access nodes supporting the performance monitoring function or supporting the relay of the performance monitoring function. An S99 interface may run over an IPv4 or IPv6 network and can be secured if needed.

A protocol running over the S99 interface may use a request-reply procedure using the source and destination cell or node identifiers of the radio access networks involved in the exchange of cell performance data. A PMC-capable node can request a single report for a specific cell or can request a single report for multiple cells. Further, the PMC-capable node can also request event-driven performance reporting for a specific cell. Events that may trigger the transmission of multiple cell performance reports may include instances when the cell performance improves, degrades or crosses a specific threshold. For example, the AC 14 may request the eNB 24 to send a report each time the eNB 24 backhaul available capacity changes from one reporting level to another, where the levels may be evenly distributed on a linear scale, or when the cell load enters or exits an overload state. As another example, the PMP 30c on the eNB 24 may trigger an alarm or notification when the capacity of the cell exceeds a threshold. This trigger or alarm may be forwarded to the PMC 32c of the eNB 24 or to the PMC 32b of the AC 14.

A maximum frequency of local cell performance reports and a frequency of the neighbor cell performance reports may be configured, allowing the operator to find the appropriate balance between accuracy and signaling load. For example, the frequency of the request/reporting for neighbor cells can be configured in the range of 10 to 300 seconds, while the sampling interval for the local cell performance reports can be shorter, for example, between 1 and 10 seconds. A minimum timer between reports may also be implemented to avoid flooding the network with too many messages.

In some embodiments, the existing 3GPP RAN Information Management (RIM) protocol may be used for the S99 interface. The current RIM protocol provides the generic procedures to communicate self-optimized network (SON) transfer request and response messages between two 3GPP radio access nodes over the core networks between peer application entities. The peer application entities may be located in a GERAN, a UTRAN, or a E-UTRAN. For instance, SON transfer RIM applications provide the transfer of SON performance information such as cell capacity loading within the same 3GPP radio access technologies or between different 3GPP radio access technologies. SON transfer RIM protocol may operate over the S1-MME interface. The basic SON transfer request container and SON transfer response container messages are already defined in the S1 AP specification. However, the transfer of RAN performance information has not been defined heretofore between 3GPP and WLAN networks.

Embodiments described herein define WLAN radio access nodes as SON transfer RIM entities. In one example, only the WLAN AC acts as SON transfer RIM entity. In another example, both the AC and the AP act as SON transfer RIM entities. Extensions to the control and provisioning of wireless access points (CAPWAP) protocol may be implemented to carry the SON transfer request container and the SON transfer response container messages when the WLAN AP is acting as an SON transfer RIM entity. The SON transfer RIM application messages are extended to include other performance indicators, such as cell user accessibility and retainability, the available transport capacity and quality, and the average UE performance.

Two specific SON transfer RIM entities are defined. The first is an SON transfer RIM endpoint (STRE). The second is an SON transfer RIM relay (STRR). In FIG. 1, an exemplary STRE 36a is located in the RNC 12. An exemplary STRE 36b is also located in the AC 14, and an exemplary STRE 36c is located in the eNB 24. An exemplary STRR 38 is located in the MME 16. Thus, the MME 16 acts as a relay entity, transferring performance data from the eNB 24 to the AC 14. The MME 16 does not need to include PMP/PMC functions since the eNB 24 is best positioned to monitor the utilization of its serving cells, monitor the end-to-end backhaul resources and estimate the average UE performance. The locations of the STREs and STRRs may vary from embodiment to embodiment and is not limited to the arrangement shown in FIG. 1.

An STRE may reside on a radio access node arranged to initiate and/or respond to SON transfer RIM information requests. An STRR may reside on a PMC-capable radio access node able to relay and route RIM information requests and responses between STRE entities. The STRR uses a destination cell or node identifier included in each RIM message to forward the request or response to the appropriate STRE. While it may do so, an STRR usually does not support the PMC function.

Figure 2:
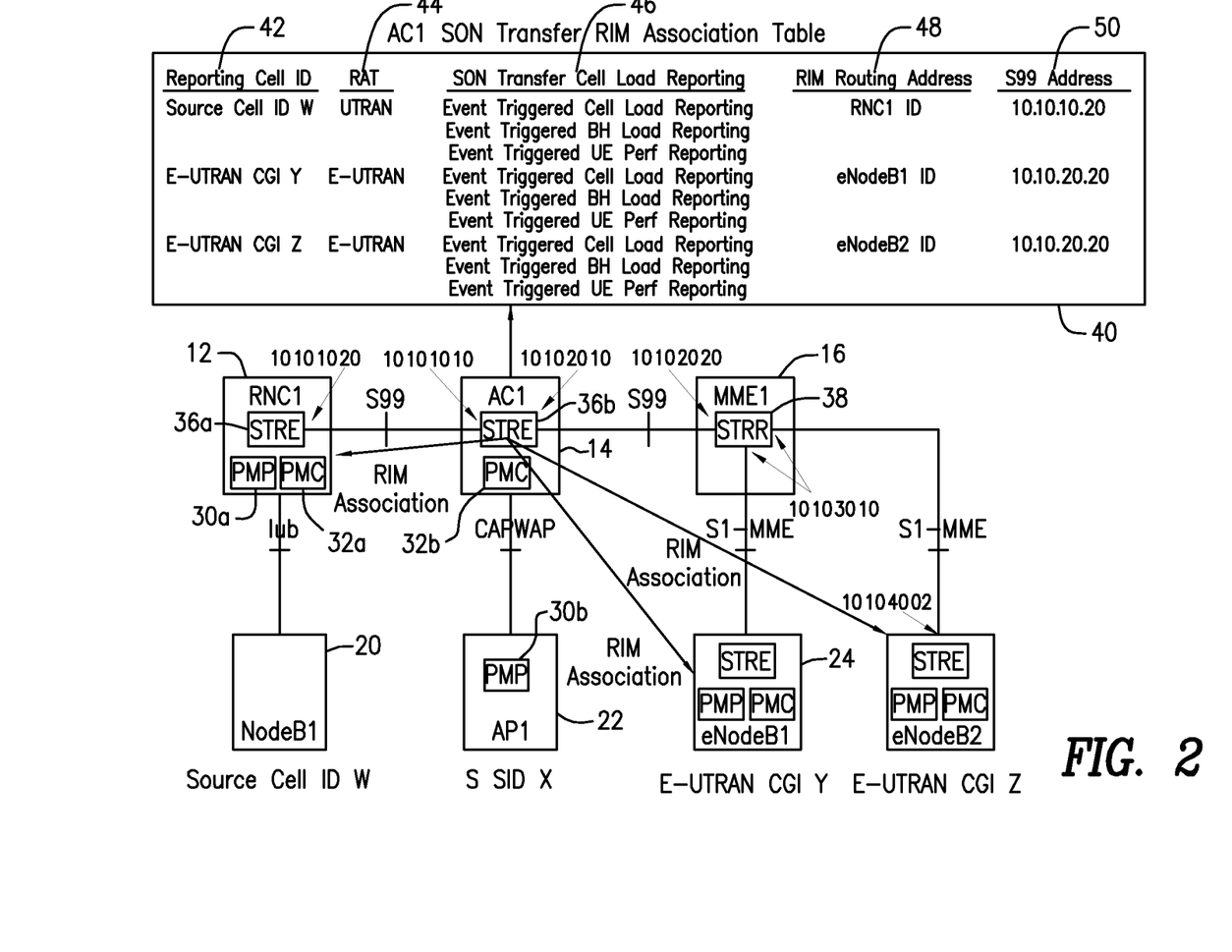
FIG. 2 is a block diagram of a communication network that performs performance monitoring of multiple radio access technologies, showing an example radio access technology information management, RIM, association table and constructed in accordance with principles of the present invention.

And STRE maintains a database of RIM associations. FIG. 2 shows an example RIM association table 40 configured on the WLAN AC 14. Each RIM association unambiguously defines a logical link between a local radio access node and a radio cell in a neighbor radio access node. For example, the RIM association table 40 includes a list of the reporting cell IDs 42, the specific radio access technology 44 associated with each cell ID, the SON transfer application identities for each RAT (46), an RIM routing address 48 for each cell ID, and an S99 IP address 50 for each cell ID.

Multiple RIM associations can be transferred over the same S99 interface. A radio access node requesting the cell performance report is known as the controlling base station subsystem (BSS) and the radio access node providing the cell performance report is known as the serving BSS. The serving BSS is also known as the reporting cell. The RIM associations can be manually configured or automatically created using an automatic neighbor relation (ANR) mechanism. In some embodiments, an access node may be prevented from setting up a RIM association to another access node by setting the RIM association administrative state to locked. This will prevent the access node from requesting cell performance reports for a specific neighbor cell.

Figure 3:
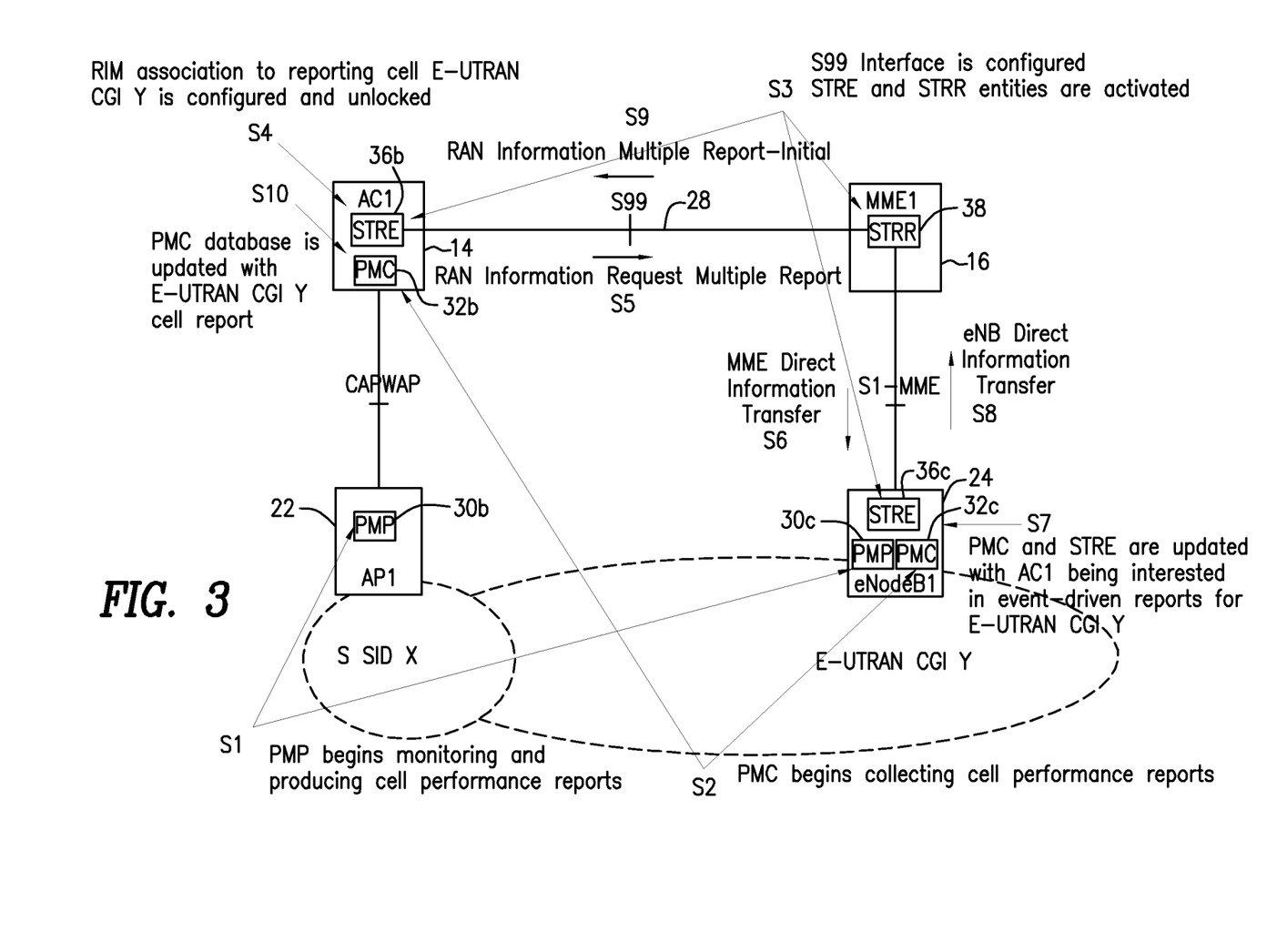
FIG. 3 is an illustration of steps performed to configure and initialize an S99 interface and a RIM association.

FIG. 3 shows exemplary steps to configure and initialize an S99 interface and an RIM association on the AC 14 toward the MME 16. In step S1, the PMPs 30b and 30c begin monitoring and producing cell performance reports. In step S2, the PMCs 32b and 32c begin collecting cell performance reports. In step S3, the S99 interface is configured and the STREs 36b and 36c, and the STRR 38, are activated. In step S4, RIM associations to reporting cell E-UTRAN CGI Y are configured and unlocked. In step S5, a radio access network information request for one or more cell performance reports is transmitted between the AC 14 and the MME 16. In step S6, the MME 16 provides direct information transfer to the eNB 24. In step S7, the STRE 36c and PMC 32c are updated by informing these entities that the AC 14 is interested in event driven reports for E-UTRAN CGI Y. In step S8, the eNB 24 provides direct information transfer to the MME 16. In step S9, RAN information in one or more cell performance reports is transferred from the MME 16 to the AC 14. In step S10, a database of the PMC 32b is updated with the cell performance report data acquired in step S9.

Figure 4:
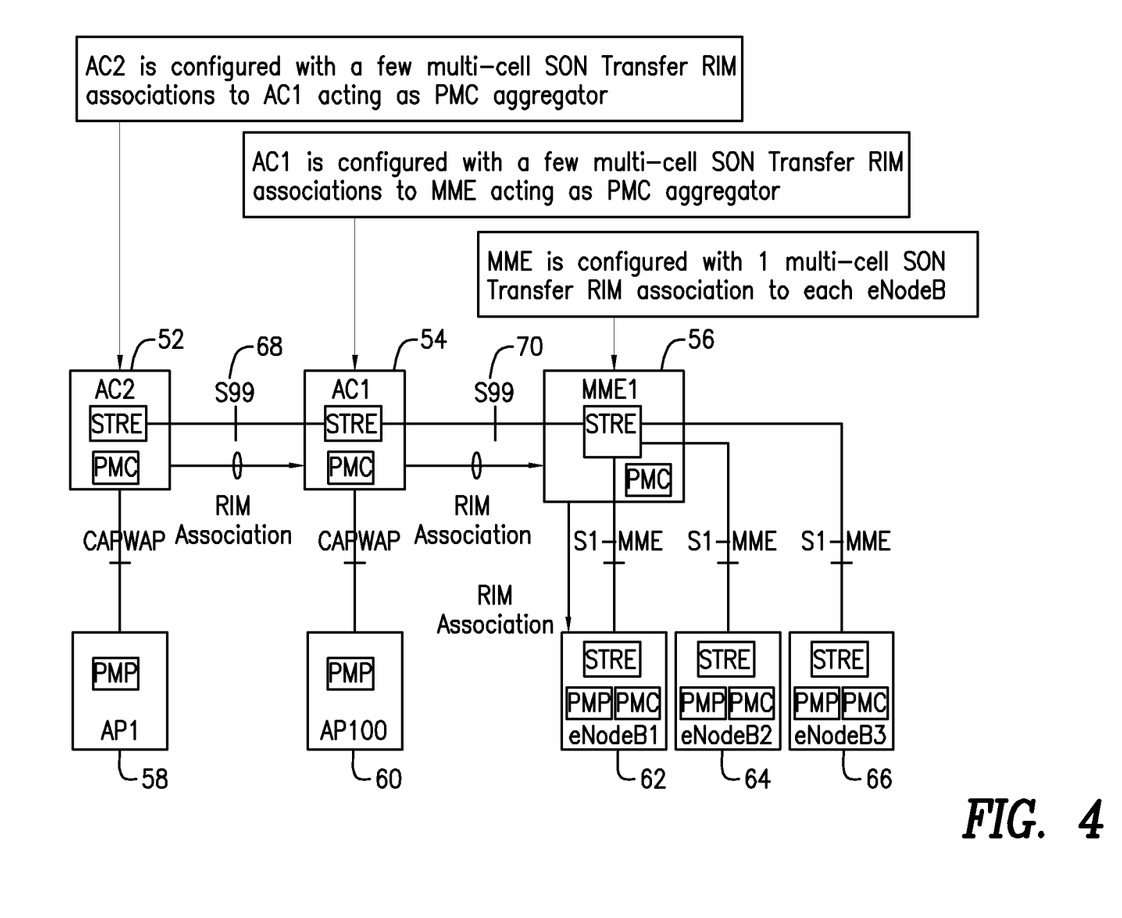
FIG. 4 is a block diagram of a communication network that performs performance monitoring of multiple radio access technologies using PMC aggregators and constructed in accordance with principles of the present invention.

A number of RIM associations can be reduced by using multi-cell load reporting associations as defined in 3GPP. The number of RIM associations, the size of the PMC database and the RIM traffic volume can further be reduced by introducing one or more serving PMC aggregators. A PMC aggregator is defined as a radio access node acting as a cell report repository able to respond to SON transfer requests on behalf of other radio access nodes. For example, instead of configuring RIM associations from the AC to a destination RIM address equal to the eNB ID, the MME may be defined as a PMC aggregator and the destination RIM address may be set equal to the MME ID. In this architecture, an example of which is shown in FIG. 4, one or a few RIM associations are established from the AC 54 to the MME 56 over an S99 interface 70, and one RIM association is established from the MME to each eNB 62, 64 and 66. With this method, the AC 54 can have a single RIM association for all neighbor E-UTRAN cells. Furthermore, a WLAN network with multiple ACs does not require a fully meshed RIM association with all of the RNCs and MMEs. As shown in FIG. 4, the RIM-based S99 interface 68 can also be deployed between two ACs. One AC 54 can act as a PMC aggregator for a given area and the other AC 52 can request cell performance reports from the AC 54. Each AC 52 and 54 can also collect performance monitoring data from its respective AP 58 and 60.

Embodiments described herein enable the operator to optimize the user experience and network resource usage and to manage the WLAN and 3GPP access network as a unified system connected to a single evolved packet core (EPC).

A number of principles may be specified that are applicable to UE access policies when deploying the ANDSF element. These principles are summarized here and are generally applicable for all cases, even when the ANDSF element is not present or not supported by the UE:

An access control policy is a set of one or more rules

The rules prioritize the access network when the UE is not capable to connect to the evolved packet core, EPC, through multiple radio accesses or indicate how to distribute traffic among available radio accesses when the UE is capable to connect to the EPC through multiple accesses At any point in time there shall be at most one rule applied; that rule is referred to as the active rule; there may be zero or one active rule.

Each rule has a set of validity conditions or criteria. For instance, a rule may only be valid if the UE is currently connected to a specific access technology based on a location and/or time-of-day.

Each rule also has a number of results. For instance, if the rule is valid, then the UE should prefer a specific access technology for all flows or should restrict a specific access technology for a given flow.

Rules are also organized in a hierarchy from the highest priority to the lowest priority. Each rule is assigned a priority and the priority is represented as a numerical value. The UE should treat the rule with the lowest priority value as the rule having the highest priority among the valid rules, where the rule with priority 1 has the highest priority Some rules can be generic and may be applicable for all cases regardless of the radio access network loading or performance. In general, it is best for the UE to redirect or select the radio access technology with the best radio conditions. Other examples of possible generic policies are highlighted below:

A policy requesting the UE to remain connected to the serving 3GPP access technology when it is considered active and currently transmitting/receiving user data unless the 3GPP serving cell and/or backhaul is overloaded.

A policy requesting the UE to prefer 3GPP radio access technology when activating a specific IP flow or media stream, e.g. voice.

However, there are exceptions to the rules when dealing with congested networks, in which cases the network or the UE must re-evaluate the current rules and possibly invalidate the current active rules or overwrite them with new rules that are designed to account for the serving and neighbor cell performance at any given time or location.

New rules can be applied when the UE is idle and not actively transmitting or receiving data. Alternatively, new rules can be applied when the UE is active. However, changing access technology during data transmission and reception may negatively impact the user experience. Thus, handover from one radio access technology to another when the UE is active should only occur under overload conditions or when the network is determined that a subscriber must be preempted.

When the ANSDF is available and supported by the UE, several different scenarios are contemplated. In one scenario, the UE initiates a secure device management (DM) session, also known as an S14 session, to reevaluate ANDSF policies each time the UE accesses a new radio access technology. There may be more than one way for the UE to discover the ANDSF. For example, the ANDSF can be a static configuration on the UE or a dynamic configuration learned by domain name server (DNS) query or dynamic host configuration protocol (DHCP) query. The ANDSF function analyzes the cell performance reports in the local PMC database and updates the priority of one or more rules associated with the UE ISMP and/or ISRP policies. This is known as the pull performance optimization mechanism. The UE should immediately apply the new active rule when applicable. After the UE is reconfigured, the UE may decide to remain connected to the WLAN, switch back to 3GPP or route certain flows on the WLAN and/or 3GPP.

In another scenario, the ANDSF initiates a secure DM session when the ANDSF is made aware that a UE has successfully accessed the new access technology and an update of the UE ISMP/ISRP policy is required. The ANDSF server analyzes the cell performance reports. If an update to the rule priority is needed, the ANDSF initiates a session by sending an unsolicited message, known as the DM Notification, to the UE. The DM Notification wakes up the UE and causes the UE to initiate a session with the requesting ANDSF-capable AC. This is known as the push performance optimization mechanism through the target system. The UE should immediately apply the new active rule. After the UE is configured, the UE may decide to remain connected to WLAN, switch back to 3GPP or route certain flows on WLAN and/or 3GPP.

In a third scenario, the ANDSF initiates a secure DM session when the ANDSF is made aware that a UE has detected a possible new access technology and an update of the UE ISMP/ISRP policy is required. The ANDSF server analyzes the cell performance reports. If an update to the rule priority is needed, the ANDSF initiates a session by sending an unsolicited message, known as the DM Notification, to the UE. The DM Notification wakes up the UE and causes the UE to initiate a session with the requesting ANDSF-capable serving cell. This is known as the push performance optimization mechanism through the serving system. The UE should immediately apply the new active rule. After the UE is configured, the UE may decide to remain connected to WLAN, switch back to 3GPP or route certain flows on WLAN and/or 3GPP.

The scenarios detailed above using the ANDSF allows the network to update the ISMP or ISRP policies based on the UE location, time of day and real-time performance of the access networks in its vicinity. The UE may also request access network discovery information. In such case, the ANDSF responds with a list of available access networks based on their respective loading conditions. Note that the second and third scenarios discussed above may be preferred because they reduce the signaling load between the UE and the network.

One option for the ANDSF to know about the radio access network performance and available capacity is for the ANDSF to act as a SON Transfer RIM Endpoint (STRE) and to request SON Transfer RIM information from specific STRE-capable access nodes like the WLAN AC 14. In this configuration, the ANDSF may request a multi-cell performance report through an S2a interface and a packet gateway may relay the request and response between the ANDSF and AC. Alternatively, the exchange can be done via a direct logical interface between an STRE-capable access node and the ANDSF.

Another option is to distribute the ANSDF function across multiple network elements possibly including the AC 14, RNC 12, MME 16 or eNodeB 24. Distributing the ANDSF function helps to distribute the workload and create a redundant system, and also avoids a need to transfer and centralize cell performance reports at a central ANSDF function.

Another set of scenarios is contemplated when the ANDSF is not available or is not supported by the UE. In one scenario, the UE decides to switch to WLAN coverage. During an IEEE 802.11 association process, the UE includes the serving cell identifier or a neighbor/overlapping cell list. The AC 14 analyzes the cell performance reports in its PMC database 32*b* and determines if the association request can proceed and move to 802.11x authentication. If the WLAN cell is working under normal conditions, the UE is usually authorized to access the WLAN network.

In another scenario, the UE decides to switch to WLAN coverage. During 802.11x (EAP) authentication, the AC 14 retrieves a set of 3GPP neighbor/overlaid cell identifiers (based on the AP 22 identifier for instance) from the subscriber profile stored in a home subscriber server/authentication, authorization and accounting (HSS/AAA) unit. The AC 14 analyzes the cell performance reports in its PMC database 32*b* and determines if the UE is granted access or not. If the WLAN cell is working under normal conditions, the UE is usually authorized to access the WLAN network. In this scenario, the UE does not provide the serving cell identifier or a neighbor cell list.

In yet another scenario, the redirection to WLAN is controlled by the 3GPP network and is triggered by the UE radio measurement reports transmitted to the 3GPP serving cell. During the radio measurement process, the UE considers any neighboring/overlapping cells detected on the associated frequency and on a set of frequencies (WLAN) which has a physical cell identity (SSID) matching the value in a configurable list. The serving 3GPP cell detects if the UE is in a poor LTE coverage area. If so, the 3GPP serving cell releases the UE with redirection information to the WLAN. If not, the 3GPP serving cell analyzes the cell performance reports and determines if the UE should be redirected to the WLAN. If redirection is not needed, the 3GPP serving cell requests the UE to stay connected to the serving cells 3GPP radio network for the moment.

Figure 5:
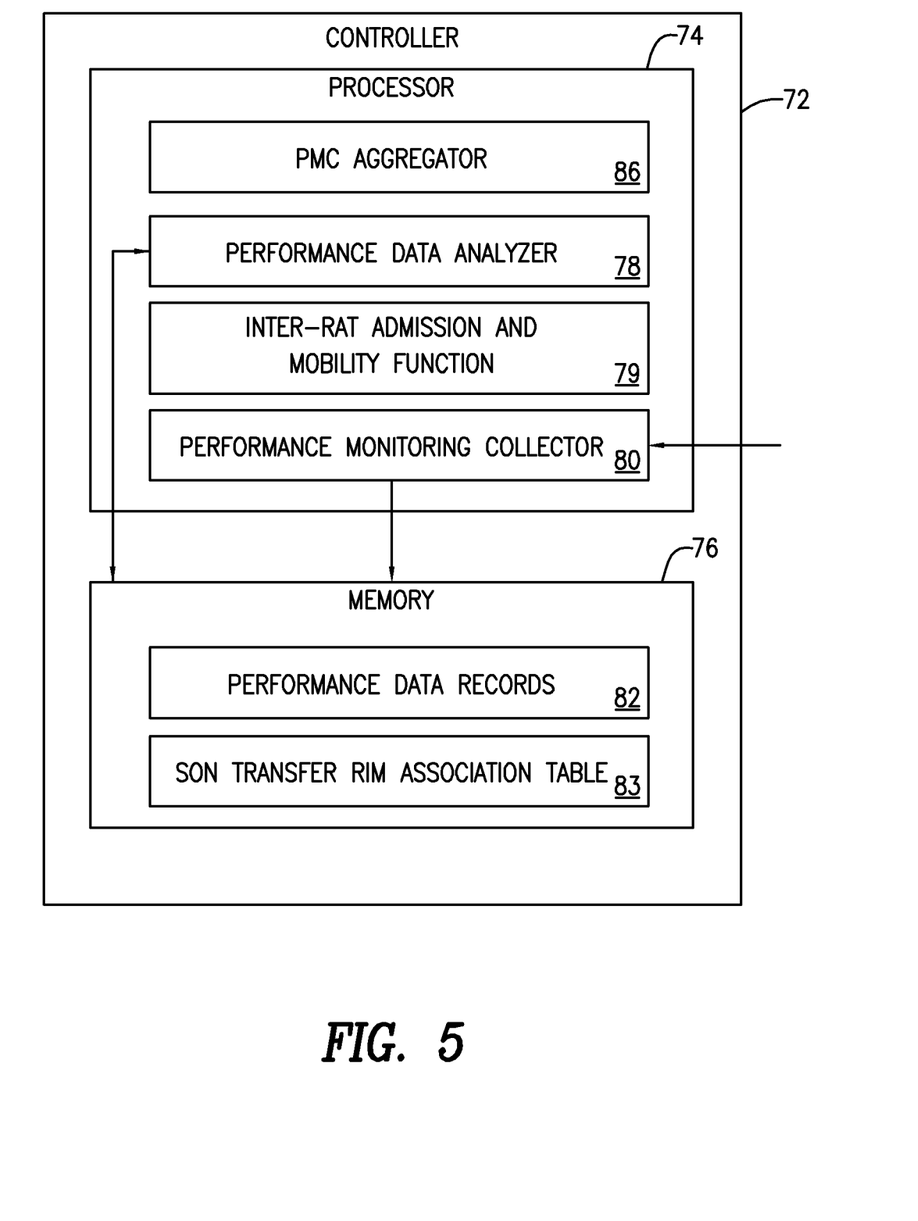
FIG. 5 is a block diagram of a controller for performance monitoring collection constructed in accordance with principles of the present invention.

FIG. 5 is a block diagram of an exemplary controller 72 for managing allocation of resources in a first radio access network. The controller 72 collects first performance data related to at least one radio cell of a first radio access network operating according to a first radio access technology and collects second performance data related to at least one radio cell from a second PMC of the second controller of a second radio access network operating according to a second RAT. Transmission of second performance data from the second PMC to the first PMC may be triggered by an event detected by a second controller of the second radio access network. The triggering event may be one of improvement and degradation of performance of a radio cell whose performance is being monitored.

The controller 72 may be located, for example, in one of a mobile management entity MME 16, a radio network controller RNC 12 and an access controller AC 14. The controller 72 includes a processor 74 and a memory 76. The processor 74 includes a performance data analyzer 78, an Inter-RAT admission and mobility function 79, a performance monitoring collector 80, and an optional PMC aggregator 86. The memory 76 stores performance data records 82 and SON Transfer RIM association table 83.

The performance monitoring collector 80 is configured to collect performance data from at least a node of the first radio access technology and from at least a node of the second radio access technology. The performance monitoring collector 80 may further be configured to collect performance data of backhaul resources of at least the first RAT and the second RAT. The performance data collected by the performance monitoring collector 80 may include average throughput performance of each user equipment using one of the first RAT and the second RAT. The performance monitoring collector may periodically issue a request for retrieving performance data. A method to exchange performance data may include RIM protocol.

The data analyzer 78 analyzes the performance data collected by the performance monitoring collector 80. The inter-RAT admission and mobility function 79 determines an allocation of resources of at least one of the first radio access technology and the second radio access technology to a user equipment based on the analysis of the performance data. The determination of an allocation of resources may be based on a policy implemented by the Inter-RAT admission and mobility function 79, which may be an ANDSF, located within the controller 72 or within a separate node. In particular, the inter-RAT admission and mobility function may trigger the selection of at least one serving radio cell for a user equipment connection based on the analysis of the data analyzer 78 and may assign the UE to the selected at least one serving radio cell. Selection of the at least one serving radio cell may be based on a policy of maintaining communication by the UE using a first RAT unless one of a cell of the first RAT in which the UE operates and a backhaul network is operating under a load that exceeds a threshold. The inter-RAT admission and mobility function 79 may further be configured to determine an allocation of flows of the UE to at least one of the first RAT and the second RAT based on an analysis of the performance data.

The PMC aggregator 86 is configured to accumulate performance data from at least one of a user equipment, a cell served by the first node and a backhaul network, and respond to requests on behalf of another PMC. The PMC aggregator 86 samples performance data periodically. A periodicity of sampling by the PMC aggregator 86 may be less than a periodicity of analysis of the performance data by the performance monitoring collector 80 for the local network.

Figure 6:
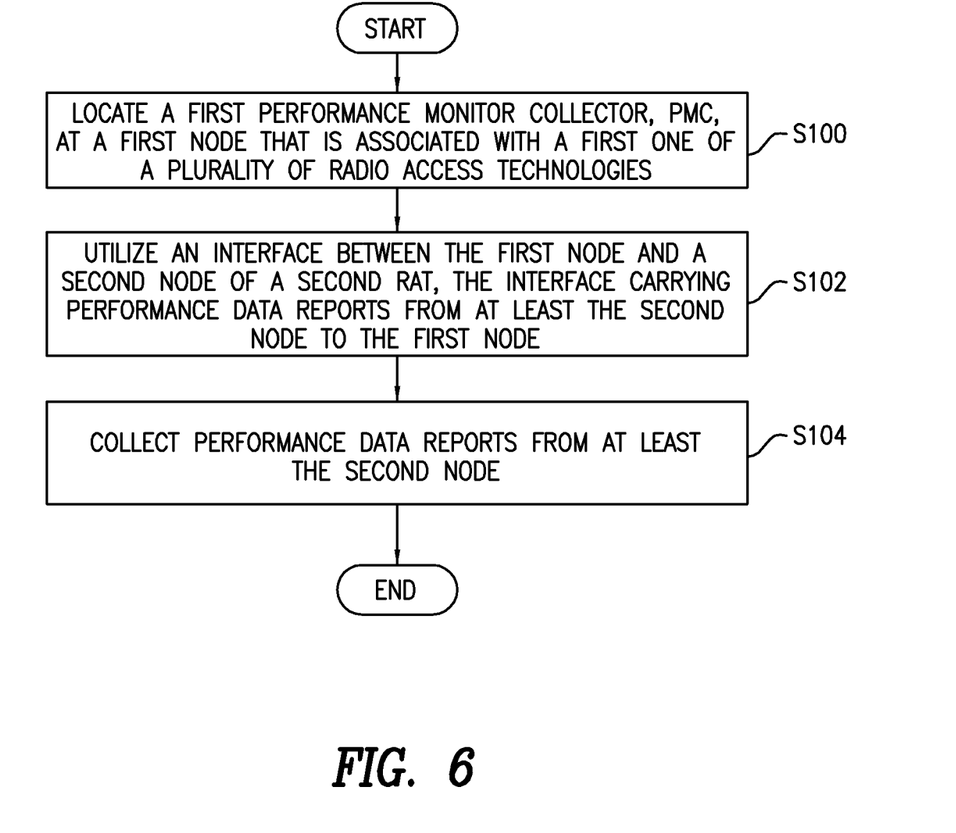
FIG. 6 is a flowchart of an exemplary process for performance monitoring of multiple RATs in a wireless communication network.

FIG. 6 is a flowchart of an exemplary process for performance monitoring of multiple RATs in a wireless communication network. In a controller of a first radio access network, a first performance monitoring collector, PMC, collects first performance data relating to a first radio cell operating according to a first RAT (block S100). The first PMC receives second performance data from one of a second PMC and PMC aggregator, where the second performance data relates to a second radio cell operating according to a second RAT (block S102). The first and second performance data are analyzed to trigger selection of at least one serving radio cell for a UE connection based on the analysis (block S104).

Some embodiments produce one or more of the following advantages. In some embodiments, 3GPP and WLAN radio and backhaul performance information may be shared and optimized without significant changes to their respective architecture and deployment models. Some embodiments provide a scalable distributed solution where the burden of performance monitoring, reporting and collecting are distributed over a large number of access nodes. In some embodiments there is no need to signal a request for available capacity each time a UE connects to an access network, thus significantly reducing the load on the network. Some embodiments transparently measure the performance of the cell and backhaul network from any radio access node without the need to deploy a new protocol within the backhaul transport network. In some embodiments, coordination between the radio access node and the backhaul transport nodes is not needed. Embodiments described herein may require very little change to the user plane or control plane signaling, protocol or architecture. Further, there may be no need to deploy or manage any additional equipment such as a bandwidth broker or locator. Also, embodiments described herein produce no significant delay during admission control or handover since the decision is made locally by the radio access node based on its current set of performance data. The volume of SON transfer RIM messages may be controlled using one or more of event-driven multiple reporting, multi-cell reporting, a smaller number of loading levels, PMC aggregators, and user-configurable frequency and minimum timing between cell performance reports. Also note that performance indicators are secure and are not shared with the UE. Further, there is no need for new IP interfaces on the eNB and nodeB, which minimizes operational complexity and cost of management.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A first controller managing allocation of resources in a first radio access network, the first controller comprising:
a first performance monitoring collector, PMC, configured to:
collect first performance data related to at least one radio cell of the first radio access network operating according to a first radio access technology, RAT, and
collect second performance data related to at least one radio cell from a second PMC of a second controller of a second radio access network operating according to a second RAT, the at least one radio cell of the second access network one of neighboring and partially geographically overlapping the at least one radio cell of the first radio network; and
a performance data analyzer configured to:
analyze the first and second performance data collected by the PMC; and
an inter-RAT admission and mobility function configured to:
trigger a selection of at least one serving radio cell for a user equipment, UE, connection based on the analysis of the first and second performance data, the at least one serving radio cell comprising one or more cells from the at least one radio cell of the first radio network and the at least one radio cell of the second radio network.

2. The first controller of claim 1, wherein the inter-RAT admission and mobility function is further configured to assign the UE to the selected at least one serving radio cell.

3. The first controller of claim 1, wherein the selection of the at least one serving radio cell, is based on a policy of maintaining communication by the UE using the first RAT unless one of a cell of the first RAT in which the UE operates and a backhaul network is operating under a load that exceeds a threshold.

4. The first controller of claim 1, wherein the data analyzer is further configured to determine an allocation of one of flows and bearers of the UE to at least one of the first RAT and the second RAT based on an analysis of the first and second performance data.

5. The first controller of claim 1, wherein the selection of the at least one serving radio cell is based on a policy that is communicated to the UE using a $3^{rd}$ generation partnership project, 3GPP, Access Network and Selection Function, ANDSF, located within one of the first controller and a separate node.

6. The first controller of claim 1, wherein the first and second performance data includes performance data of backhaul resources of at least one of the first RAT and the second RAT.

7. The first controller of claim 1, wherein the performance data includes at least one of accessibility, retainability and utilization characteristics of serving cells and target cells of at least the first RAT and the second RAT.

8. The first controller of claim 1, wherein the performance data includes average throughput performance of each user equipment, UE, using one of the first RAT and the second RAT.

9. The first controller of claim 1, wherein the first controller is located in one of a mobile management entity, MME, an access controller, and a radio network controller, RNC, of the first RAT.

10. The first controller of claim 1, wherein the first controller is located in an Access Controller, AC, of the first RAT.

11. The first controller of claim 1, wherein the first RAT is $3^{rd}$ generation partnership project, 3GPP, technology, and the second RAT is WiFi technology.

12. The first controller of claim 1, wherein the first PMC periodically issues a request for retrieving performance data from one of another PMC and a PMC aggregator of at least one node of one of the first RAT and the second RAT.

13. The first controller of claim 12, wherein a method to retrieve performance data is a 3GPP Radio Access Network, RAN, Information Management, RIM, protocol.

14. The first controller of claim 12, wherein the first PMC samples performance data periodically, a periodicity of sampling being less than a periodicity of analysis of the performance data by the performance analyzer.

15. The first controller of claim 12, wherein transmission of second performance data to the first PMC is triggered by an event detected by the second controller of the second radio access network.

16. The first controller of claim 15, wherein the triggering event is one of improvement and degradation of performance of one of the at least one radio cell of the first radio network and the at least one radio cell of the second radio network.

17. A method of monitoring resources of a plurality of different radio access technologies, RATs, the method comprising:
in a controller of a first radio access network:
collecting at a first performance monitoring collector, PMC, of the controller, first performance data relating to a first radio cell operating according to a first RAT of the plurality of RATs;
receiving at the first PMC, second performance data from one of a second PMC and a PM aggregator, the second performance data relating to a second radio cell operating according to a second RAT of the plurality of RATs; and
analyzing the first and second performance data to accomplish at least one of:
triggering selection of at least one serving radio cell for a user equipment connection based on the analysis of the first and second performance data, the at least one serving radio cell comprising one or more cells from the at least one radio cell of the first radio network and the at least one radio cell of the second radio network.

18. The method of claim 17, further comprising assigning the UE to the selected at least one serving radio cell.

19. The method of claim 17, wherein collecting the performance data reports from one of the second PMC and the PMC aggregator includes sending a request from the first PMC to the one of the second PMC and the PMC aggregator.

20. The method of claim 17, wherein the first PMC is located in one of a mobile management entity, MME, an access controller, and a radio network controller, RNC, of the first RAT.

21. A system for managing resources in a wireless communication system having a plurality of radio access technologies, RATs, the system including:
a first controller comprising a first performance monitoring collector, PMC, located at a first node of a first RAT and configured to:
collect first performance data relating to a first radio cell operating according to the first RAT; and
receive and collect second performance data from a second PMC located at a second node of a second RAT, the second performance data relating to a second radio cell operating according to the second RAT, the second RAT being different from the first RAT;

the second PMC located at the second node of the second RAT and configured to collect the second performance data from the second radio cell and to transmit the second collected performance data to the first PMC; and a first analyzer configured to analyze the first and second performance data to determine a serving radio cell to serve a first user equipment, UE; and a first inter-RAT admission and mobility function configured to trigger selection of at least one first serving radio cell for the first user equipment, UE, connection based on the analysis of the first and second performance data, the at least one first serving radio cell comprising one or more cells from the at least one radio cell of the first radio network and the at least one radio cell of the second radio network.

22. The system of claim 21, further comprising:
a second controller comprising a second PMC located at the second node of the second RAT and configured to:
collect the second performance data relating to the second radio cell operating according to the second RAT; and
receive and collect the first performance data from the first PMC located at the first node of the first RAT, the first performance data relating to the first radio cell operating according to the first RAT;
a second analyzer configured to analyze the first and second performance data to determine a serving radio cell to serve a second user equipment; and
a second inter-RAT admission and mobility function configured to trigger selection of at least one second serving radio cell for the second user equipment, UE, connection based on the analysis of the first and second performance data by the second analyzer, the at least one second serving radio cell comprising one or more cells from the at least one radio cell of the first radio network and the at least one radio cell of the second radio network.

23. The system of claim 21, wherein first inter-RAT admission and mobility function is further configured to assign the first UE to the selected at least one serving radio cell.

24. The system of claim 21, wherein:
the first RAT is $3^{rd}$ generation partnership project, 3GPP, technology and the first node is one of an evolved node B, eNB, and a mobile management entity, MME; and
the second RAT is WiFi technology and the second node is one of an access controller and an access point.

25. The system of claim 21, wherein:
the first RAT is WiFi technology and the first node is one of an access controller and an access point; and
the second RAT is $3^{rd}$ generation partnership project, 3GPP, technology and the second node is one of an evolved node B, eNB, and a mobile management entity, MME.

26. The system of claim 21, wherein the first node is a radio network controller, RNC, and the second node is an access controller.

* * * * *